(12) United States Patent
Chiu et al.

(10) Patent No.: US 8,222,903 B2
(45) Date of Patent: Jul. 17, 2012

(54) AUTOMATIC TESTING DEVICE AND METHOD FOR COMPUTER SYSTEM

(75) Inventors: Chia-Chang Chiu, Hsinchu (TW); Chin-Jung Chang, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 780 days.

(21) Appl. No.: 12/266,547

(22) Filed: Nov. 6, 2008

(65) Prior Publication Data
US 2010/0112416 A1     May 6, 2010

(51) Int. Cl.
*G01N 27/416*     (2006.01)
(52) U.S. Cl. ........................................ 324/426
(58) Field of Classification Search .................. None
See application file for complete search history.

(56) References Cited

U.S. PATENT DOCUMENTS

| | | | |
|---|---|---|---|
| 5,307,290 A * | 4/1994 | Raviglione et al. | 701/29 |
| 6,661,122 B1 * | 12/2003 | Dunnihoo | 307/127 |
| 7,558,798 B2 * | 7/2009 | Nguyen | 455/572 |
| 2004/0113496 A1 * | 6/2004 | Nguyen | 429/61 |
| 2010/0066308 A1 * | 3/2010 | Chiu | 320/136 |

* cited by examiner

*Primary Examiner* — Jermele M Hollington
(74) *Attorney, Agent, or Firm* — Apex Juris, pllc; Tracy M. Heims

(57) ABSTRACT

An automatic testing device and method are provided to automatically test a computer system that has an electric component and a battery. First of all, a power control module controls the electricity supplied from the battery to the electric component. Next, when the computer system enters a designated mode, a battery-related component status is retrieved from a recording module through a connection interface. Afterwards, according to the battery-related component status, the computer system obtains testing information to determine whether the electric component operates normally. Since the power control module, the connection interface and the recording module are internal elements commonly configured computer system, the proposed device and method facilitate the testing tasks without any external instruments.

15 Claims, 4 Drawing Sheets

AUTOMATIC TESTING DEVICE AND METHOD FOR COMPUTER SYSTEM

BACKGROUND OF THE INVENTION

1. Field of the Invention

The present invention relates to a testing device and method, in particular, to an automatic testing device and method adapted to a computer system.

2. Related Art

The general computer system such as notebook computer or tablet computer requires external instruments for a testing engineer to test circuits and components within the computer system. To retrieve the circuit board of the computer system for testing, the computer system needs to be dismounted troublesomely. If malfunctions occur on the computer system, the testing engineer will still have to test for multiple times even the user feedbacks the situations of the computer system.

Besides, most of the testing software tools available in the market are designated to test single component in the computer system, such as testing only Central Processing Unit (CPU), Wireless LAN Card, Random Access Memory (RAM) or hard disk. However, sometimes the problems happened on the computer system result from poor wiring or poor configuration of the circuit board without any relation to the single components. Therefore, there exits some error results while testing.

For instance, within the military-use or industry-use computer system that is operated under special environmental factors much more restrictive than normal computers, a heater is employed for heating a liquid bearing of the hard disk. When the computer system is booting under a low temperature such as −20° C., the heater is able to maintain the operation of the hard disk above 0° C., thereby protecting the hard disk from damages of operating under low temperature environment.

However, due to long term usage or operation under wrong voltage, the resistance of the heater unexpectedly increases; even worse, the heater burns out and causes shortcut. Therefore, the heater will not be able to heat the hard disk effectively under low temperature environment, which further make the computer system fail to boot up or the damage of the hard disk. In such condition, the computer system in the prior art still requires external instruments (such as electric multimeter) for a testing engineer to facilitate the testing tasks.

Therefore, how to provide a non-external instrument or method for performance the testing of the computer system has become a serious issue pending for resolutions.

SUMMARY OF THE INVENTION

To solve the aforesaid problems of the prior art, the present invention provides an automatic testing device and method for a computer system. By means of the device and method disclosed in the present invention, without any external testing instruments or dismounting the computer system, operation statuses of electric components (such as a heater for hard drive) configured within the computer system or broadly the computer system will be fast tested to dramatically increase the testing efficiency of a testing engineer and the accuracy of testing tasks.

In one aspect of the present invention, an automatic testing device is provided to test a computer system that has at least one electric component, a connection interface and a battery. The automatic testing device includes a recording module and a power control module. The recording module records battery-related component status when the battery supplies electricity to the electric component. The connection interface has an end electrically connecting with the recording module. The power control module electrically connects with another end of the connection interface and controls the electricity supplied from the battery to the electric component; wherein when the computer system is at a designated mode, the battery-related component status is retrieved through the connection interface, and testing information is obtained according to the battery-related component status to determine whether the electric component operates normally.

In another aspect of the present invention, an automatic testing method is provided to automatically test a computer system that has an electric component and a battery. The automatic testing method comprises the following steps. First of all, a power control module controls the electricity supplied from the battery to the electric component. Next, when the computer system enters a designated mode, a battery-related component status is retrieved from a recording module through a connection interface. Afterwards, according to the battery-related component status, the computer system obtains testing information to determine whether the electric component operates normally.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
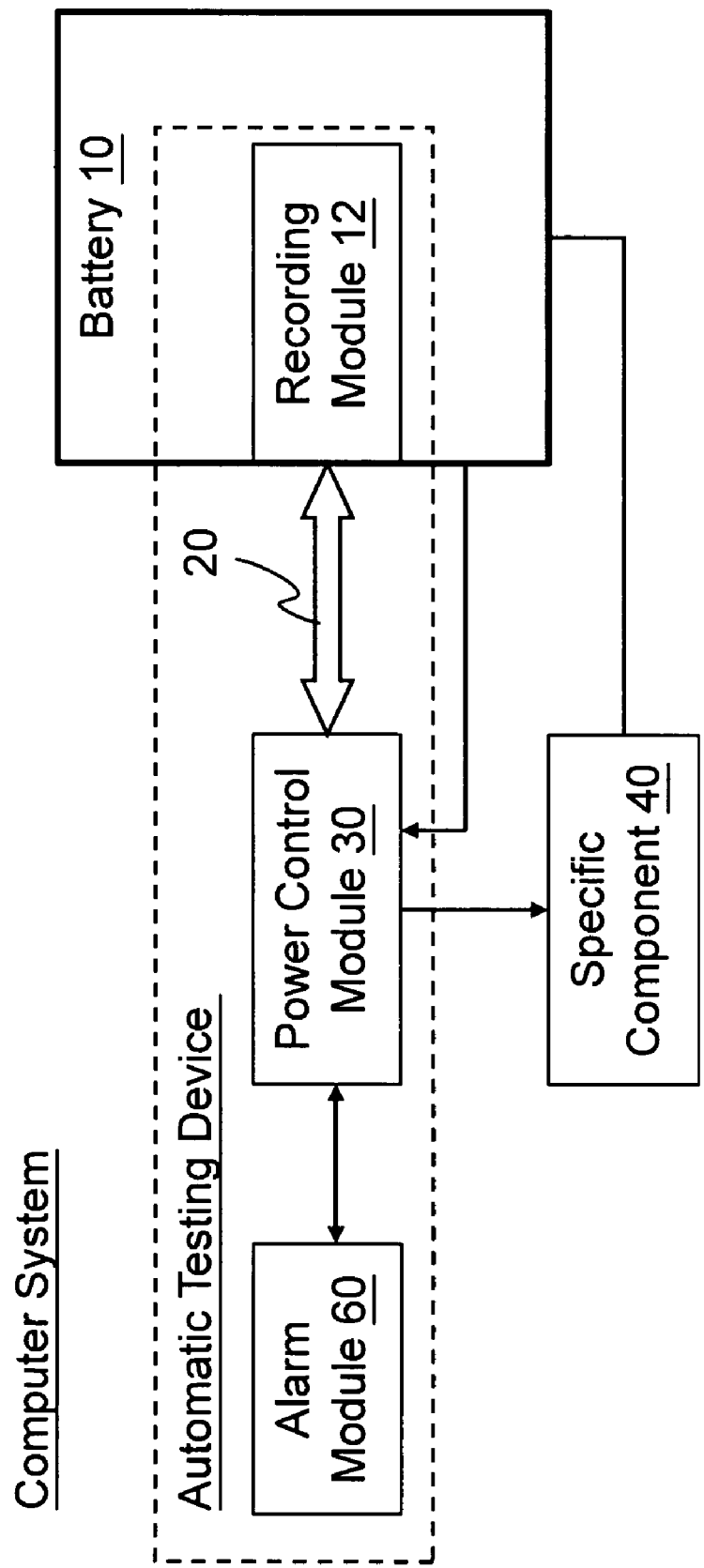
FIG. 1 is an explanatory block diagram of an automatic testing device according to a first embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

Please refer to FIG. 1, which is an explanatory block diagram of an automatic testing device according to a first embodiment of the present invention. The automatic testing device disclosed in the present invention is used to test a computer system that has at least one electric component 40 and a battery 10. Other system components of the computer system, such as central processing unit (CPU), system memory, bus bridge chip and system bus and etc., are omitted in the drawings of the present invention. The automatic testing device mainly comprises a recording module 12, a connection interface 20 and a power control module 30.

The recording module 12 records "battery-related component status" when the battery 10 supplies electricity to the electric component 40. The "battery-related component status" comprises a voltage value and an electric current value supplied from the battery 10 to the electric component 40. Here the recording module 12 may be realized by a battery gauge IC (Integrated Circuit) that tests the battery within a general computer system (such as a notebook computer). When the battery 10 supplies electricity to the electric component 40, the voltage value and the electric current value supplied to the electric component 40 will be recorded in the recording module 12.

The connection interface 20 has an end connected with the recording module 12, and the other end connected with the power control module 30; wherein the connection interface 20 may be realized by SMBus (System Management Bus) or I2C Bus (Inter-integrated Circuit Bus). Both the two buses are the common bus interfaces available in a general computer system.

The power control module 30 controls the electricity that the battery 10 supplied to the electric component 40. When the computer system is at a designated mode, from the connection interface 20 the battery-related component status may be retrieved from the recording module 12; according to the received battery-related component status, the electric component 40 will be able to determine whether the electric component is operating normally. Here the battery-related component status may comprise the voltage values and/or the electric current value supplied from the battery 10 to the electric component 40. Therefore, from the voltage value (V) and the electric current (I) of the battery-related component status, the basic Ohm's law (R=V/I) will be applied to calculate/obtain the resistance value (R) of the electric component 40. Generally when every electric component of the computer system is at a normal condition, the resistance of the electric component will remain within a standard range. Therefore when testing information of the electric component 40 (namely the resistance value of the electric component 40) exceeds the standard range it should be, there exists a malfunction on the electric component 40.

Please refer to FIG. 1 again. As shown in the drawing, the automatic testing device disclosed in the present invention further comprises an alarm module 60. When the obtained testing information indicates that the electric component 40 is under malfunction, the alarm module 60 may be used accordingly to output an alarm signal and notice a user for accompanying reactions such as replacing the abnormal electric component.

In the present embodiment, the aforesaid power control module 30 may be realized by a KBC (keyboard controller) or an EC (embedded controller) integrated with certain functions including KBC. Both of the two controllers are quite common control units in a general computer system.

Briefly for the descriptions above, the recording module 12, the connection interface 20 and the power control module 30 of the automatic testing device disclosed in the present embodiment, are all internal components within the computer system. In some practical condition, all these components may be realized by those elements that are already exiting in the prior art computer and may be operated according to specific routines, such as the steps of the automatic testing method mentioned in below sections and accompanying drawings. Therefore by means of the device and method disclosed in the present invention, without any external testing instruments or dismounting the computer system, operation statuses of electric components (such as a heater for hard drive) configured within the computer system or broadly the computer system will be fast tested to dramatically increase the testing efficiency of a testing engineer and the accuracy of testing tasks.

In the present embodiment, the designated mode is one of "Standby mode" and "Power-Off mode" of the computer system, which modes are designated power modes commonly defined in the prior art. Namely, to perform the testing operation disclosed in the present invention, the computer system needs to enter the standby mode or the power-off mode. For example, if the testing operation is performed when the computer system is operating at a normal mode (like a general "power-on mode" with an operating system under operation), the testing result will be inaccurate. It is because in the normal mode there are many application programs or peripheral apparatuses under operation and the battery-based component status is not a stable value when the component is under operation. If the user requests to ascend the brightness of the display, the electric current value supplied by the computer system will be increased to ascend the brightness of the display and satisfy the user's demand. Therefore, the battery-based component status of the electric component is not a stable value when the electric component is under operation, which will certainly cause the inaccuracy of testing. On the contrary, if the computer system is at the standby mode (sometimes "sleep mode") or the power-off mode, the electric current value supplied to the non-operating electric component will be at a stable status, thereby contributing to a more accurate result. Therefore in the present invention, the designated mode are defined as those operation modes that the computer system (or its power supply modules such as the battery) supplies stable electricity to the electric component.

When the designate mode is the power-off mode, the testing tasks may be preset before turning off the computer system, so as to perform the testing tasks when the computer system is turned off (namely at the power-off mode). In such implementation, the testing information may be preset to output after the next time the computer system is turned on.

Figure 2:
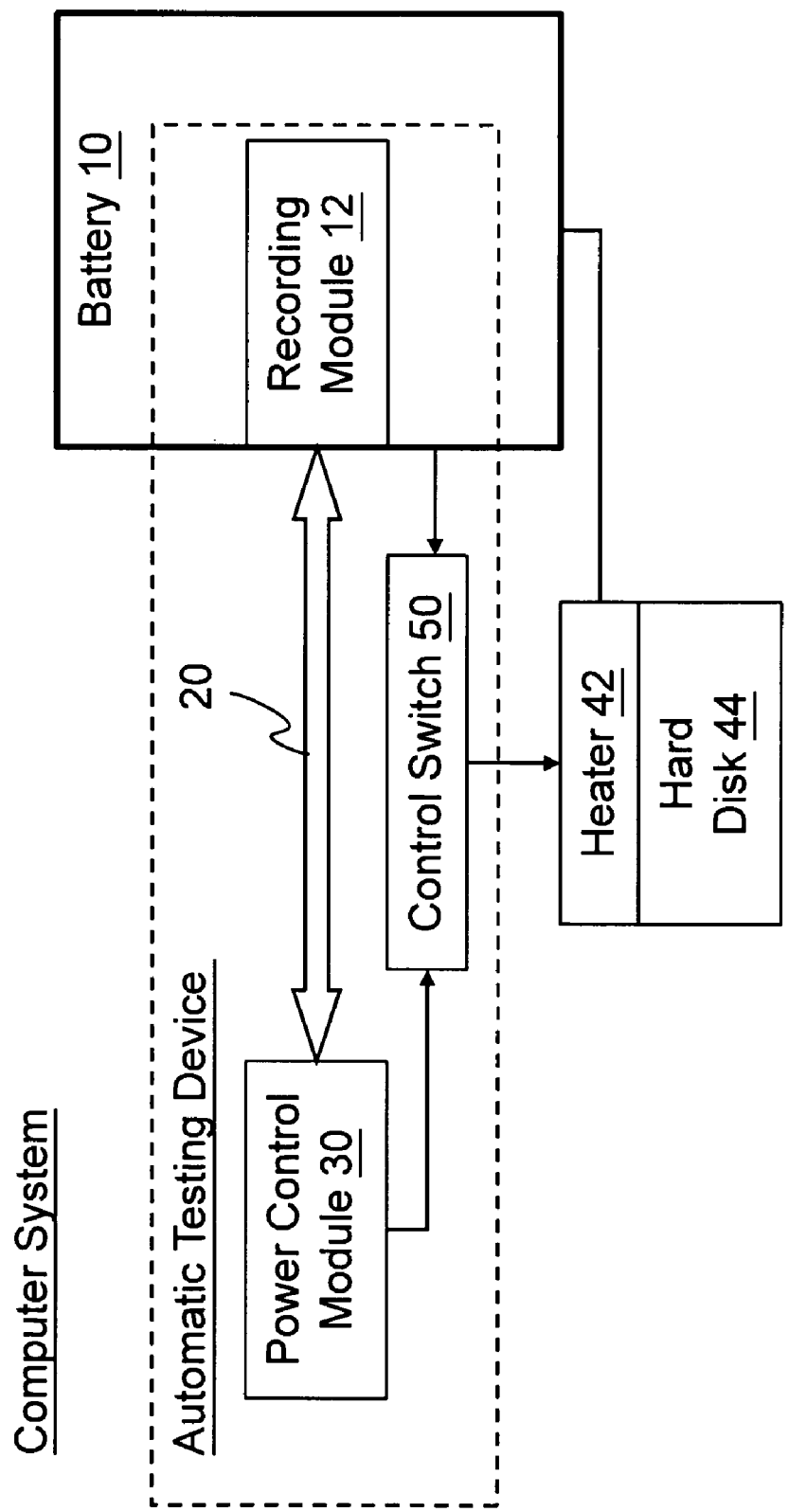
FIG. 2 is an explanatory block diagram of an automatic testing device according to a second embodiment of the present invention.

Please refer to FIG. 2, which is an explanatory block diagram of an automatic testing device according to a second embodiment of the present invention. In the second embodiment, the automatic testing device further includes a control switch 50; and meanwhile, more concrete examples are given to define the electric component herein. In the present embodiment, the electric component may be a heater 42 that heats a hard disk 44, which is adapted to a military-use or industry-use computer system. When the computer system boots up under a low temperature environment, the electric component, namely the heater 42 is able to maintain the hard disk 44 at higher than 0° C. to protect the hard disk 44 from low temperature damage.

The control switch 50 respectively connects with the battery 10, the power control module 30 and the heater 42. The control switch 50 receives a control signal from the power control module 30, to control the electricity supplied from the battery 10 to the heater 42. That means, according to the control signal sent from the power control module 30, the control switch 50 is to control whether the electricity supplied from the battery 10 is sent to the heater 42 or not.

In the present embodiment, if the heater 42 malfunctions, such as the heater 42 is burned off, the tested resistance of the malfunctioned heater 42 will not match a normal standard value range. Therefore, through the resistance of the heater 42, it is practical to determine whether the heater 42 malfunctions.

Figure 3:
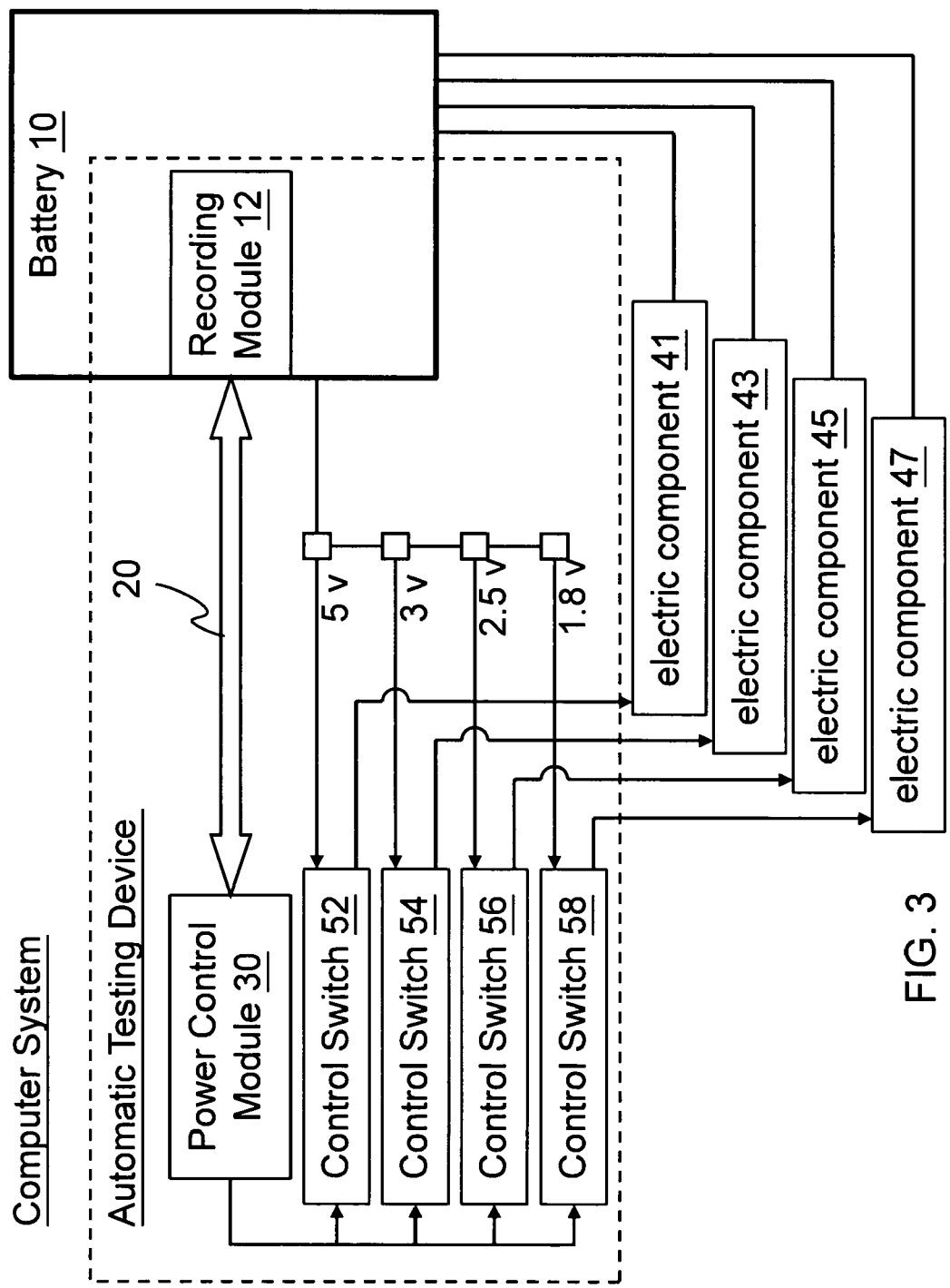
FIG. 3 is an explanatory block diagram of an automatic testing device according to a third embodiment of the present invention.

Please refer to FIG. 3, which is an explanatory block diagram of an automatic testing device according to a third embodiment of the present invention. In the third embodiment, there are four but not limited to four control switches, each controlling different electricity powers provided by the battery 10 but with different voltage values.

A general computer system has different operation powers each having different voltage values for different electric components to operate. Therefore, in the third embodiment, the battery 10 supplies multiple operation powers; each of the operation powers has different voltage values. As shown in FIG. 3, the battery 10 supplies four different operation powers 5v, 3v, 2.5v and 1.8v through DC-DC converters (such as the four unmarked squares in FIG. 3), but not limited to the four operation powers. The power control module 30 sends control signals to each of the control switches 52, 54, 56, 58 (with or without a certain sequence), to control the electricity supplied from the battery 10 to each of the corresponding electric components 41, 43, 45, 47 respectively.

For example, the battery 10 may initiate different operation powers with or without a certain sequence. First of all, the power control module 30 sends a control signal to the control switch 58, so as to control the 1.8v operation power to be supplied to the electric component 47 (such as CPU). Through the connection interface 20, the power control module 30 receives/retrieves the battery-related component status from the recording module 12; according to the battery-related component status the power control module 30 may obtain the testing information corresponding to the operation power of 1.8v. Next, the power control module 30 sends a control signal to the control switch 56 to initiate the next operation power 2.5v and send the operation power 2.5v to the electric component 45, such as a south bridge or north bridge. Meanwhile, the power control module 30 may obtain the testing information corresponding to the operation power 2.5v through the way similar to the operation power 1.8v. Similarly, the power control module 30 sends control signals to the control switches 54, 52 and then allow the operation powers 3v and 5v to the corresponding electric components 43, 41, and then retrieves/receives the corresponding sets of testing information. Once the different operation powers was supplied to the corresponding electric components, different sets of testing information corresponding to the operation powers and electric components may be obtained, thereby the computer system or the user may be aware whether there exists any electric component malfunctioning under the corresponding operation power.

As a further explanation, although there are only the four electric components 41, 43, 45, 47 disclosed in FIG. 3, they represent all the electric components equipped in the computer system. Therefore when different operation powers are initiated, all the corresponding electric components will be supplied with the operation powers. Furthermore, in the aforesaid third embodiment, an utility program and corresponding hardware functions may be provided to the user so that the user may optionally determine which specific operation power to be initiated solely; namely the electric component(s) corresponding to the determined operation power may be particularly tested, thereby allows the user to optionally determine the electric component that he requests to test.

Figure 4:
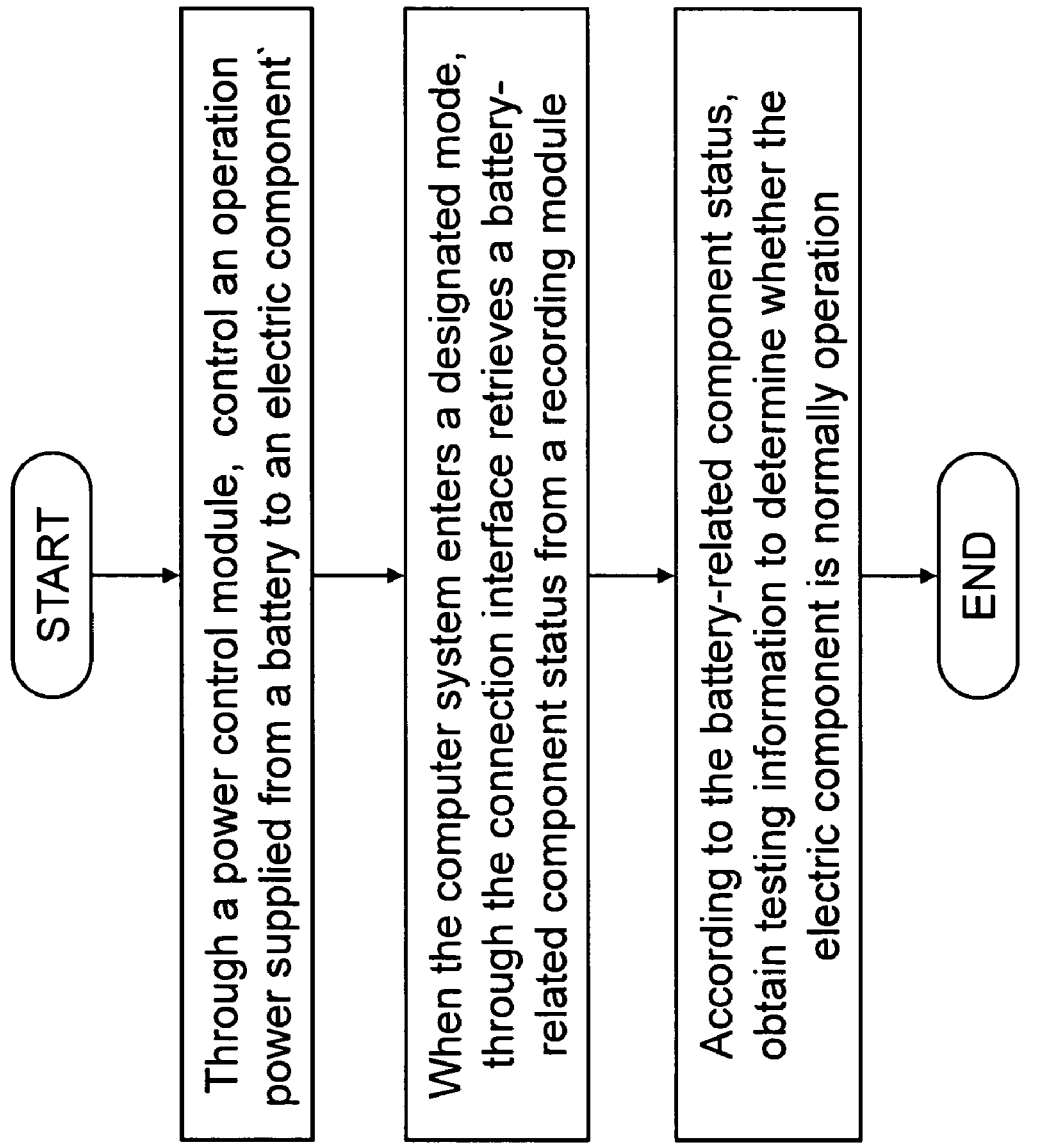
FIG. 4 is a flow chart of an automatic testing method according to the present invention.

Please refer to FIG. 4, which is a flow chart of an automatic testing method according to the present invention. The automatic testing method is adapted to testing of a computer system that has electric component(s) and battery equipped therein. The method comprises the follow steps.

Step S10: Through a power control module, control operation power(s) supplied from the battery to electric component (s): wherein, the power control module comprises KBC (keyboard controller) or EC (embedded controller).

Step S20: When the computer system enters a designated mode, through the connection interface retrieves a battery-related component status from a recording module; wherein, the battery-related component status includes a voltage value and an electric current value supplied from the battery to the electric component. The recording module may comprise a battery gauge IC (integrated Circuit) that is configured on the battery and used for testing the battery. The connection interface may comprise SMBus (System Management Bus) or I2C Bu (Inter-integrated Circuit Buss). Moreover, the designated mode may be a standby mode or a power-off mode of the computer system.

Step S30: According to the battery-related component status, obtain testing information to determine whether the electric component is normally operation; wherein, the testing information includes a resistance of the electric component. Namely, whether the resistance of the electric component is within a standard range, is used to determine whether the electric component is malfunctioning; wherein, the electric component may be a heater for a hard disk of the computer system.

Aside from the aforesaid steps, the automatic testing method may further comprises the following steps: provide a battery with multiple operation powers, the operation powers corresponding to different voltage values; the power control module controls the battery to supply the operation powers to corresponding electric components; receives/retrieves battery-related component statuses corresponding to the different operation powers (and the corresponding electric components).

Furthermore, to allow the user to be aware of the malfunction of the electric component, an alarm signal may be issued according to the testing information to notice and have the attention of the user.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. An automatic testing device adapted to testing a computer system that has at least one heater and a battery, the automatic testing device comprising:
    a recording module, recording battery-related heater status when the battery supplies electricity to the heater;
    a connection interface with an end electrically connecting with the recording module; and a power control module, electrically connecting with another end of the connection interface and controlling the electricity supplied from the battery to the heater;
    wherein when the computer system is at a designated mode, the battery-related heater status is retrieved through the connection interface, and testing information is obtained according to the battery-related heater status to determine whether the heater operates normally;
    wherein the battery-related heater status comprises a voltage value and an electric current value supplied from the battery to the heater and wherein the testing information comprises a resistance of the heater.

2. The automatic testing device as claimed in claim 1, wherein the recording module comprises a battery gauge IC (Integrated Circuit).

3. The automatic testing device as claimed in claim 1, wherein the connection interface comprises SMBus (System Management Bus) or I2C Bus (Inter-integrated Circuit Bus).

4. The automatic testing device as claimed in claim 1, wherein the power control module comprises a KBC (keyboard controller) or an EC (embedded controller).

5. The automatic testing device as claimed in claim 1, wherein the designated mode is a standby mode or a power-off mode of the computer system.

6. The automatic testing device as claimed in claim 1, wherein the battery comprises a plurality of operation powers and the computer system has a plurality of electric components, each of the operation powers corresponding to different voltage values, the power control module controlling the operation powers of the battery supplied respectively to the corresponding electric component and receiving a battery-related component status corresponding to each of the operation powers.

7. The automatic testing device as claimed in claim 1 further comprising:
   at least a control switch, electrically connecting with the battery, the power control module and the heater respectively, and receiving a control signal from the power control module to supply electricity of the battery to the heater.

8. The automatic testing device as claimed in claim 1 further comprising:
   an alarm module issuing an alarm signal according to the testing information.

9. An automatic testing method to test a the computer system that has at least one heater and a battery, the automatic testing method comprising the steps of:
   through a power control module, controlling the electricity supplied from the battery to the heater;
   when the computer system enters a designated mode, retrieving a battery-related heater status from a recording module through a connection interface; and
   according to the battery-related heater status, obtaining testing information to determine whether the heater operates normally;
   wherein the battery-related heater status comprises a voltage value and an electric current value supplied from the battery to the heater and wherein the testing information comprises a resistance of the heater.

10. The automatic testing method as claimed in claim 9, the recording module comprises a battery gauge IC (Integrated Circuit).

11. The automatic testing method as claimed in claim 9, wherein the connection interface comprises SMBus (System Management Bus) or I2C Bus (Inter-integrated Circuit Bus).

12. The automatic testing method as claimed in claim 9, wherein the power control module comprises a KBC (keyboard controller) or an EC (embedded controller).

13. The automatic testing method as claimed in claim 9, wherein the designated mode is a standby mode or a power-off mode of the computer system.

14. The automatic testing method as claimed in claim 9 further comprising the following step of:
   providing the battery with a plurality of different operation powers and providing the computer system with a plurality of electric components, the operation powers corresponding to different voltage values;
   the power control module controls the battery to supply each of the operation powers to the corresponding electric component; and
   retrieving battery-related component statuses corresponding to the different operation powers.

15. The automatic testing method as claimed in claim 9 further comprising the following step of:
   issuing an alarm signal according the testing information.

* * * * *